Aug. 4, 1936.  H. FRIESER ET AL  2,049,697
LENTICULATED FILM FOR PROCESSES IN COLOR CINEMATOGRAPHY
Filed Aug. 17, 1933
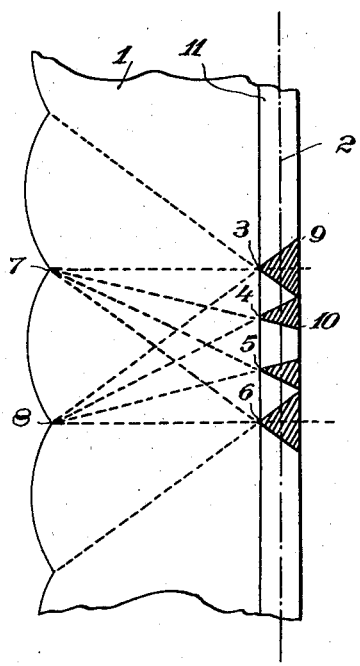
INVENTORS.
Helmut Frieser and
Edgar Gretener
BY Gifford, Scull & Burgess
ATTORNEYS.

Patented Aug. 4, 1936

2,049,697

UNITED STATES PATENT OFFICE 2,049,697

LENTICULATED FILM FOR PROCESSES IN COLOR-CINEMATOGRAPHY

Helmut Frieser, Berlin-Pichelsdorf, and Edgar Gretener, Berlin-Siemensstadt, Germany, assignors to Opticolor, Aktiengesellschaft, Glarus, Switzerland, a Swiss corporation Application August 17, 1933, Serial No. 685,536
In Germany August 25, 1932

1 Claims. (Cl. 95—2)

Our invention relates to a new lenticulated film, which is useful for processes in color-cinematography and especially for getting prints.

The predominant feature of the new film is a very thin emulsion-layer, which is about 0.008 mm., but may also be even thinner e. g. 0.005 mm. One advantage of the new film is a better color-rendering than could be reached before. The definition of colors is better and the colors are much purer. Other advantages will be seen from the following description.

A sectional view of a part of the new film is shown in the figure.

The support or base 1 which may be made by celluloid bears on one side the emulsion layer 2. The opposite side is lenticulated. When the film is exposed, images of a multicolor filter which is arranged by the objective and formed e. g. by three differently colored zones, are photographed behind each lenticular element. It is sufficient to regard the images behind one of said elements.

At the boundary of the support and the emulsion layer the three images are lying between the points 3, 4, 5 and 6, so that they seem to be well separated. But the light is incident on the layer under a large angle. All light which passes between the edges 7 and 8 and between the points 3 and 4, exposes those parts of the emulsion, which lie between the straight lines running from 8 to 3 and from 7 to 4. Thus at the rear surface of the layer 2 the zone between 3 and 4 has widened to extend from 9 to 10. As the light which passes through the other zones and which is consequently of other colors exposes similarly shaped regions of the layer, the regions overlap at those parts marked by hatching.

This fact is perhaps the reason for the better definition of colors got with the new films. For if the thickness of the emulsion layer is further diminished the size of the overlapping regions is equally diminished. If e. g. the rear surface of the emulsion layer would be represented by the dash-dotted line 11, the differently colored light-beams are very much less mixed.

A consequence of the better color-rendering by employing the new films is that they may be developed by any negative-process, so that only the prints drawn from them are positive images. Nevertheless the color-rendering is as good as if normal lenticular films are developed by the usual inversion process. This is of great importance, as the negative process has many advantages as compared with the inversion process.

The number of chemical processes is smaller and their performance and control is much easier with the negative-process than with the inversion. Besides, the images developed by inversion are often disturbed by clumps of reduced silver-grains especially if a means solving silver-bromide is used in the first delevoper. The size of said clumps is about that of the lenticular elements. Sometimes they are somewhat smaller and sometimes somewhat greater. Their shape is very irregular. The average of their size is about that of a region which may, by exposition and development, be blackened without blackening also the neighbouring parts in consequence of too small definition. Such clumps are hardly to be found when the film is developed by a negative process.

Further the range of exposure of the emulsions is much wider when the negative process is used so that it is easier to avoid over- or under-exposure.

The definition of the colors could already be increased when normal lenticular films were developed by inversion and a means dissolving silver-bromide was used in the first developer. This means was also apt for decreasing the thickness of the layer. But it could be proved that the films with thin emulsion-layer have advantages, which may not be observed with normal films. One of these is—as was said already—the avoiding of clumps of silver-grains, which are not observed with thin layers, even if they are developed by inversion.

The new films are used for taking and for printing purposes. They may be developed as negatives or by inversion. In any case the quality of colors is much better than with thicker layers.

What we claim is:

In a cinematographic film, a translucent base having on one side thereof an emulsion and on the opposite side thereof a multiplicity of lenticulations adapted to form, on the emulsion, images of the zones of a color filter, said images adjoining each other where the emulsion meets the base but overlapping within the emulsion, the thickness of said emulsion being between approximately 0.005 mm. and 0.008 mm., thereby materially reducing the overlapping of said images within the emulsion.

HELMUT FRIESER.
EDGAR GRETENER.